(12) United States Patent
Eryilmaz

(10) Patent No.: US 12,275,530 B2
(45) Date of Patent: Apr. 15, 2025

(54) AIRCRAFT PROPULSION SYSTEM

(71) Applicant: ROLLS-ROYCE plc, London (GB)

(72) Inventor: Ibrahim Eryilmaz, Bedford (GB)

(73) Assignee: Rolls-Royce PLC, London (GB)

( * ) Notice: Subject to any disclaimer, the term of this patent is extended or adjusted under 35 U.S.C. 154(b) by 279 days.

(21) Appl. No.: 17/859,125

(22) Filed: Jul. 7, 2022

(65) Prior Publication Data
US 2023/0038062 A1 Feb. 9, 2023

(30) Foreign Application Priority Data
Jul. 22, 2021 (GB) .................................. 2110536

(51) Int. Cl.
*B64C 11/00* (2006.01)
*B64D 27/24* (2006.01)
(Continued)

(52) U.S. Cl.
CPC ............ *B64D 27/24* (2013.01); *B64C 11/001* (2013.01); *F04D 25/0606* (2013.01);
(Continued)

(58) Field of Classification Search
CPC ....... B64C 11/001; B64D 27/34; B64D 27/24; B64D 35/021; H02K 7/116; H02K 21/16; H02K 2213/03
See application file for complete search history.

(56) References Cited

U.S. PATENT DOCUMENTS 11,077,953 B2 * 8/2021 Harvey ...................... F02K 5/00
11,313,327 B2 * 4/2022 Harvey .................. B64D 35/06
(Continued)

FOREIGN PATENT DOCUMENTS

| CN | 107882655 A | 4/2018 |
|----|-------------|--------|
| EP | 3569857 A1 | 11/2019 |
| GB | 2565886 A | 2/2019 |

OTHER PUBLICATIONS

Great Britain search report dated Apr. 4, 2022, issued in GB Patent Application No. 2110536.6.
(Continued)

*Primary Examiner* — Woody A Lee, Jr.
*Assistant Examiner* — Behnoush Haghighian

(57) ABSTRACT

An aircraft propulsion system comprises a propulsor an electric motor coupled to the propulsor. The electric motor comprises a surface mounted permanent magnet electric machine comprising a rotor mounted radially inward of a stator. A Motor Diameter Ratio (MDR) is defined as an inner diameter ($D_{stator,in}$) of the motor stator in metres divided by an outer diameter ($D_{stator,out}$) of the motor stator in metres. The MDR of the electric motor stator is within 10% of the value given by the equation:

$$MDR = 0.83 \times \left(\frac{\text{Torque}}{L_{active}} \times \frac{1}{U_{fan,\,tip}}\right)^{0.08}$$

where:
T is the maximum torque rating of the electric motor in kilonewton metres;
$L_{active}$ is the active length of the motor stator in metres; and
$U_{tip}$ is the tip speed of the propulsor at the maximum rated torque of the electric motor in metres per second.
In the described embodiments, the MDR is less than 1.

15 Claims, 9 Drawing Sheets

(51) Int. Cl.
 *F04D 25/06* (2006.01)
 *H02K 21/16* (2006.01)
 *B64D 27/34* (2024.01)
 *B64D 35/021* (2024.01)
 *H02K 7/116* (2006.01)

(52) U.S. Cl.
 CPC ............ *H02K 21/16* (2013.01); *B64D 27/34* (2024.01); *B64D 35/021* (2024.01); *H02K 7/116* (2013.01); *H02K 2213/03* (2013.01)

(56) References Cited

U.S. PATENT DOCUMENTS

| | | | |
|---|---|---|---|
| 2019/0288571 A1* | 9/2019 | Lehikoinen | B64D 27/24 |
| 2019/0344900 A1* | 11/2019 | Harvey | F02K 5/00 |
| 2020/0102912 A1* | 4/2020 | Harvey | F02C 6/00 |
| 2021/0119499 A1* | 4/2021 | Lehikoinen | H02K 1/165 |
| 2023/0283145 A1* | 9/2023 | Duan | H02K 1/276 |
| | | | 310/83 |

OTHER PUBLICATIONS

European search report dated Nov. 11, 2022, issued in EP Patent Application No. 22181136.7.

* cited by examiner

AIRCRAFT PROPULSION SYSTEM

CROSS-REFERENCE TO RELATED APPLICATIONS

This specification is based upon and claims the benefit of priority from United Kingdom Patent Application No. 2110536.6, filed on Jul. 22, 2021, the entire contents of which are incorporated herein by reference.

BACKGROUND

Technical Field

Aircraft propulsion systems have been proposed which utilise one or more electric machine to drive one or more propulsor, such as a propeller or fan. The present disclosure concerns an electric propulsion system for an aircraft, and an aircraft comprising an electric propulsion system.

Description of Related Art

Several types of electric machine are known for use in such propulsion systems. One such electric machine type is the surface mounted permanent magnet electric machine, in which a rotor comprising one or more permanent magnet is provided to rotate relative to a stator comprising electric windings.

In order to provide acceptable range and aircraft performance, such systems must have high power density, high efficiency, and compact size. It is also necessary to consider the propulsion system as a whole when designing the electric machine, in order to provide an efficient overall propulsion system. The present disclosure relates to an optimised propulsion system, which seeks to provide high efficiency, and low overall system weight.

SUMMARY

According to a first aspect there is provided an aircraft propulsion system comprising:
a propulsor;
   an electric motor coupled to the propulsor; wherein
   the electric motor comprises a surface mounted permanent magnet electric machine comprising a rotor mounted radially inward of a stator; and wherein
a Motor Diameter Ratio (MDR) is defined as an inner diameter of the motor stator in metres divided by an outer diameter of the motor stator in metres, and wherein the MDR of the electric motor stator is within 10% of the value given by the equation:

$$MDR = 0.83 \times \left( \frac{\text{Torque}}{L_{active}} \times \frac{1}{U_{fan,\, tip}} \right)^{0.08}$$

where:
T is the maximum torque rating of the electric motor in kilonewton metres;
$L_{active}$ is the active length of the motor stator in metres; and
$U_{tip}$ is the tip speed of the propulsor at the maximum rated torque of the electric motor in metres per second; and wherein the MDR is less than 1.

It has been found that, by providing an aircraft propulsion system having the above motor characteristics, an optimised balance of power density, aerodynamic, electrical and thermal performance is achieved.

The motor diameter ratio may be within 5%, and preferably within 2% of the value given by the above equation.

The motor active length $L_{active}$ may be defined as the region of the stator responsible for generating torque upon the rotor.

The propulsion system may comprise a ducted fan, and may comprise a boundary layer ingesting fan.

The electric motor and propulsor may be directly coupled, such that the motor and propulsor rotate at the same speed in use.

In a further embodiment, the propulsion system may comprise a reduction gearbox configured to couple the electric motor to the propulsor, such that the propulsor rotates at a lower speed than the motor in use.

The gearbox may define a reduction ratio of between 1:1 and 2.5:1.

The electric motor may comprise a radial-flux electric motor.

The electric motor may define a maximum torque rating T of between 0.5 and 70 kilonewton metres (kN·m). The electric motor may define a maximum power of between 0.1 and 100 Megawatts (MW). The electric motor may define a maximum rotational speed of between 500 and 50000 Revolutions per Minute (RPM).

The propulsion system may be configured to operate at a maximum cruise speed of between Mach 0.6 and 0.9 at a maximum cruising altitude of between 20,000 feet and 40,000 feet.

The propulsor may define a maximum in use pressure ratio of between 1.2 and 1.8 during cruise conditions, and may comprise a hub-to-tip ratio of between 0.2 and 0.7.

According to a second aspect there is provided an aircraft comprising a propulsion system according to the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
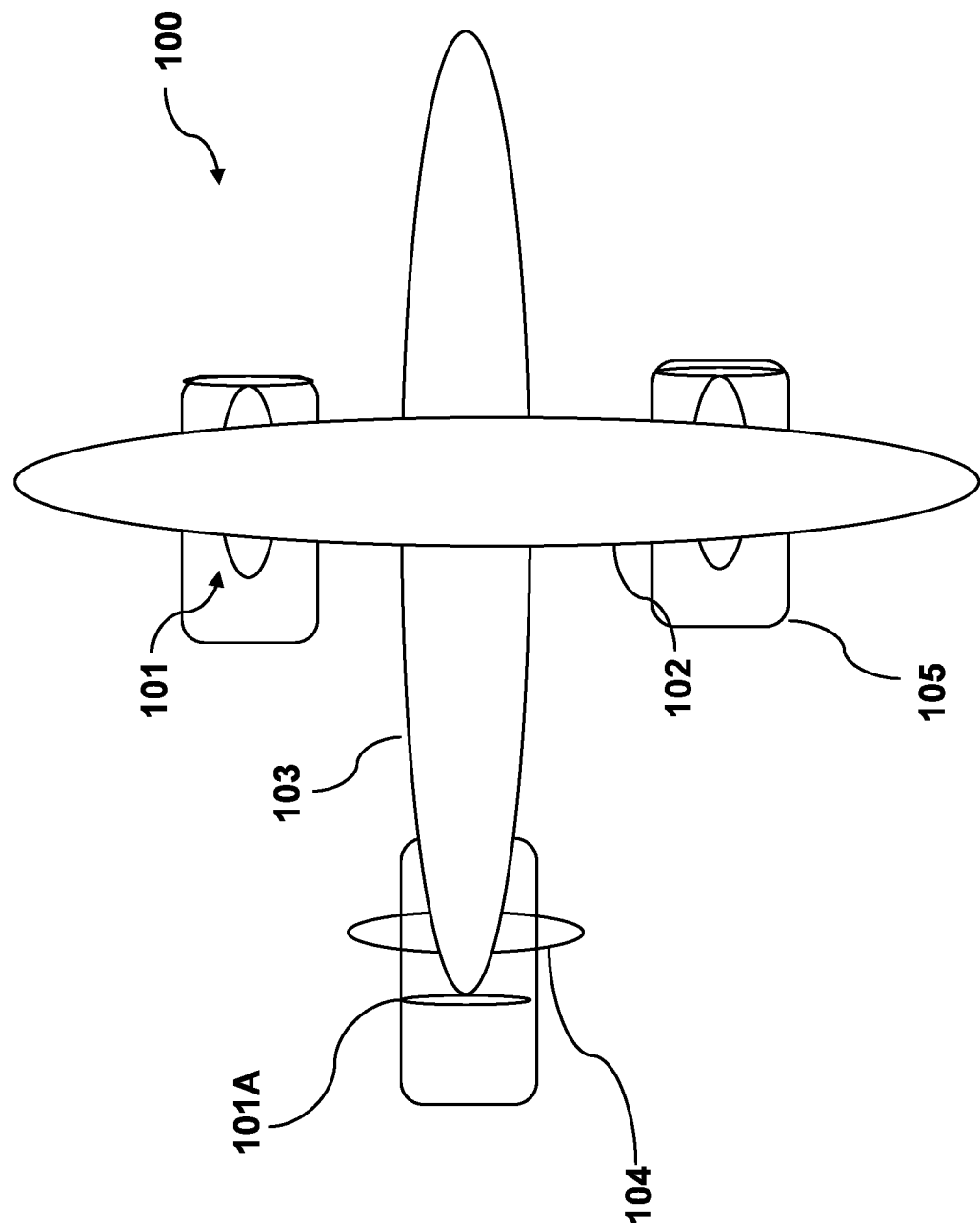
FIG. 1 is a plan view of an aircraft comprising a propulsion system.

With reference to FIG. 1, an aircraft 1 is shown. The aircraft is of conventional configuration, having a fuselage 103, wings 102, tail 104 and a pair of propulsion systems 101. One of the propulsion systems 101 is shown in detail in FIG. 2. A further, optional propulsion system 101A may be provided at the tail of the aircraft.

The propulsion system is shown generally at 101, attached to the wing 102 of the aircraft 100 by a pylon 103.

Figure 2:
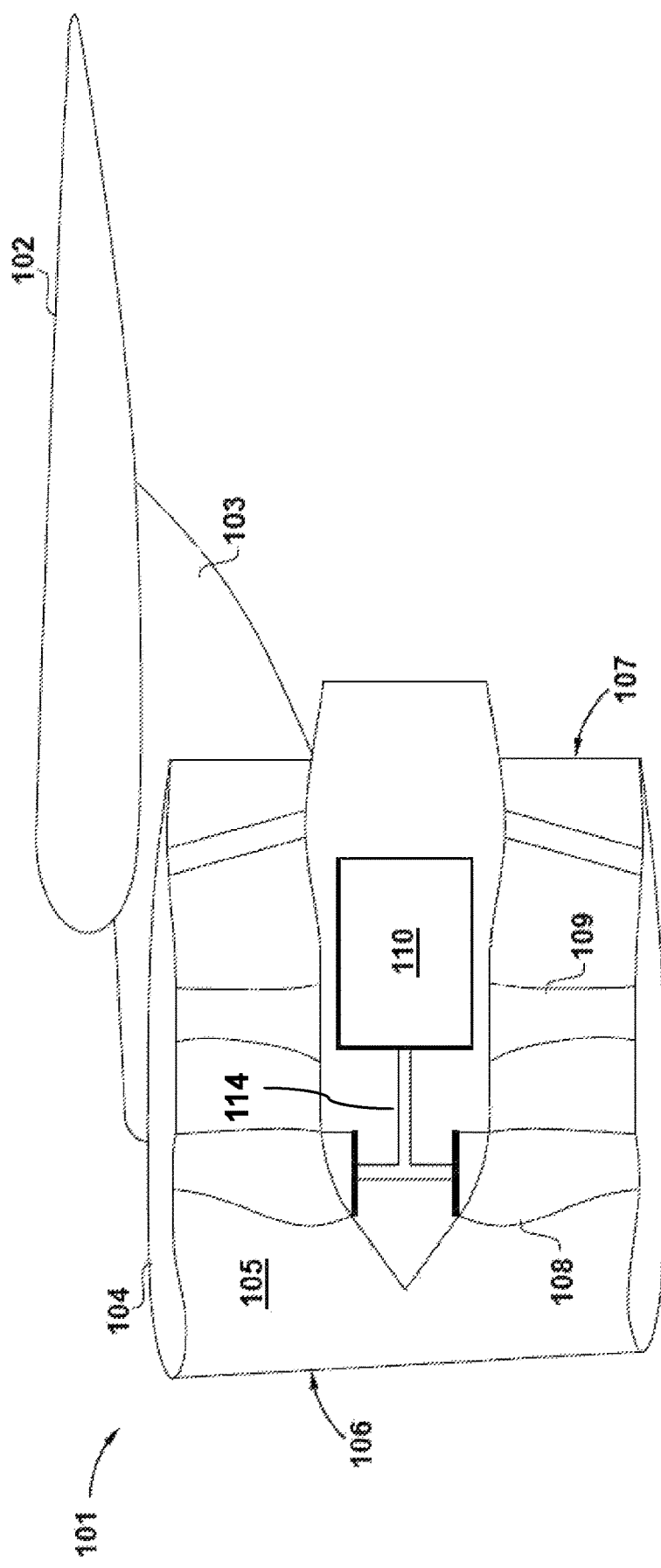
FIG. 2 is a schematic diagram of a propulsion system for the aircraft of FIG. 1.

Being a ducted fan, the propulsor 101 comprises a nacelle which defines a duct 105 having an inlet 106 and a nozzle 107, and in which a propulsive fan 108 is located. In operation, the fan 108 raises the pressure of intake air, with swirl in the airflow being removed by outlet guide vanes 109. The airflow is directed through the nozzle 107 to generate thrust. In the embodiment of FIG. 2, the fan 108 is driven by an electric machine 110 in the form of a motor. The electric motor 110 and fan 108 are directly coupled via a shaft 114. Consequently, no gearbox is present, and the motor 110 and fan 108 rotate together in the same direction, and at the same rotational speed in use in a so-called "direct drive" arrangement. This can be contrasted with a "geared-drive" arrangement, in which a reduction gearbox is provided between the motor and fan.

The propulsion system 101A is similar to the system 101, but is of a "Boundary Layer Ingesting" type, which is configured to ingest a boundary layer adjacent the fuselage in use. As will be understood, the boundary layer is typically defined as the layer of air adjacent a wetted surface. The boundary layer thickness is defined as the region of air having a velocity less than 99% of the freestream flow velocity.

Figure 3:
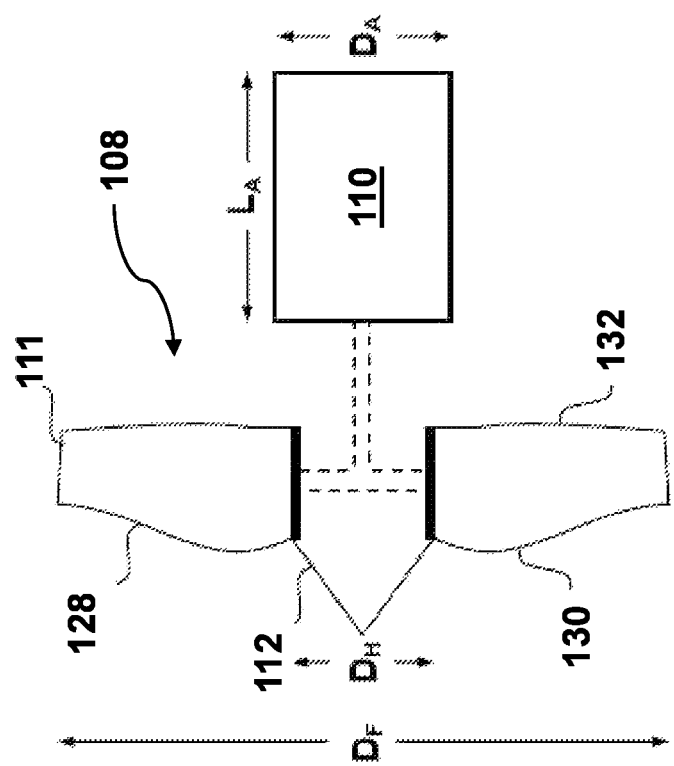
FIG. 3 is a schematic cross-sectional side view of part of the propulsion system of FIG. 2.

As shown in FIG. 3, several physical dimensions of the propulsion system can be defined. The fan 108 has a diameter $D_F$ defined as a distance between opposite tips 111 of the fan 108. The fan 108 comprises a plurality of blades 128, each blade having a leading 130 and trailing 132 edge. A hub diameter $D_H$ is similarly defined as a distance between opposite radially outer sides of a hub 112. Consequently, a hub-to-tip ratio can be defined as the hub diameter $D_H$ divided by the fan diameter $D_F$.

Figure 4:
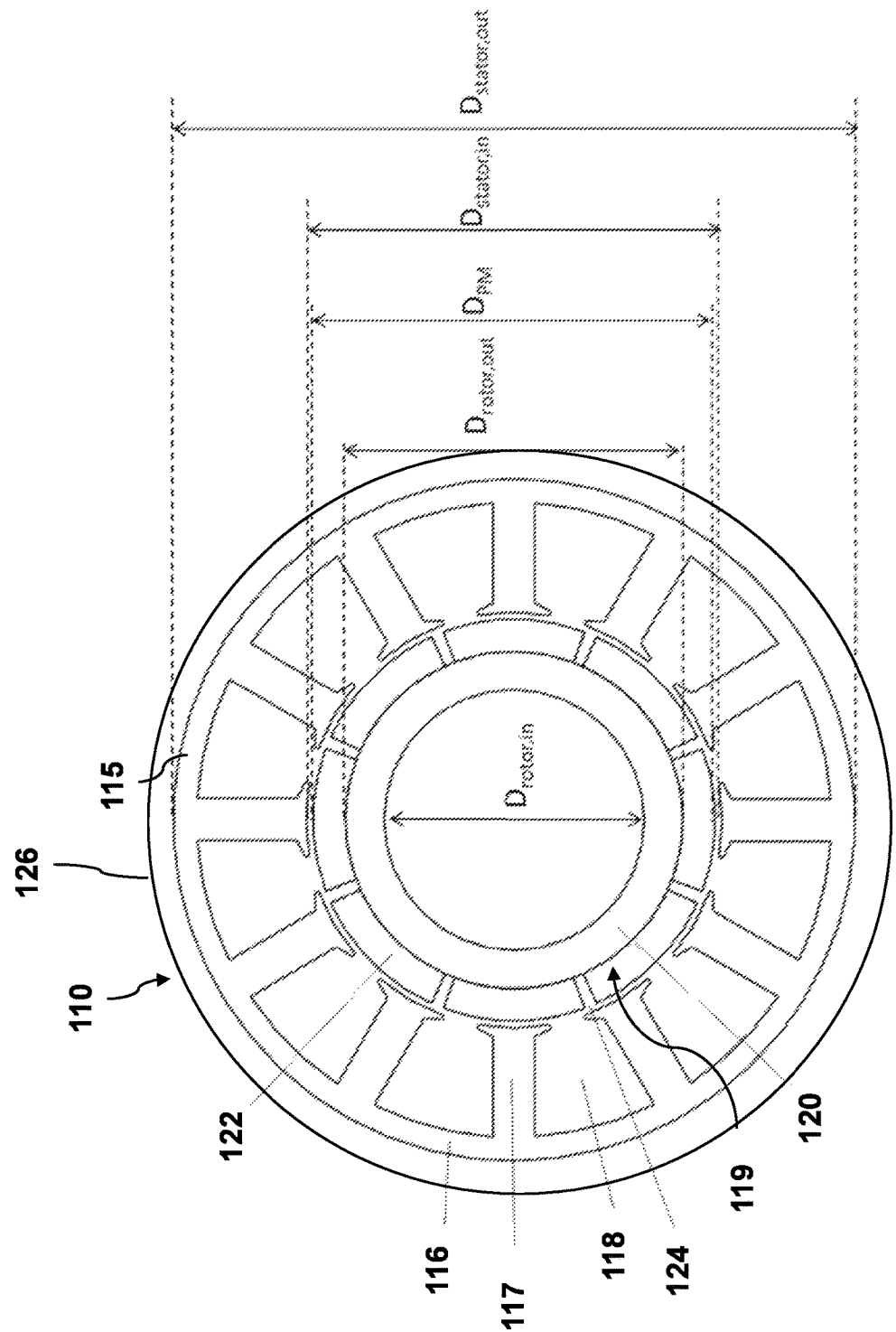
FIG. 4 is a cross-sectional front view of an electric motor of the propulsion system of FIG. 2.

Referring to FIG. 4, additional features and dimensions of the motor 110 are shown. The electric motor 110 is of the surface mounted permanent magnet type in an in-runner, radial flux architecture. The motor 110 comprises a stator 115 which in turn comprises a stator yoke 116, from which stator teeth 117 project inwardly to define a plurality of stator slots 118 therebetween. Stator windings (not shown) are provided within the stator slots 118, wound around the teeth 117. The motor 110 further comprises a permanent magnet rotor 119 comprising a yoke 120 to which a plurality of surface mounted permanent magnets 122 are mounted. Radially between the permanent magnets 122 and stator teeth 117 is an air gap 124, across which magnetic flux is transmitted in a generally radial direction between the rotor and stator to generate rotor torque. Consequently, the motor can be said to be a brushless, synchronous AC motor of the surface mount permanent magnet type, having an "in-runner" rotor, and being of radial flux design.

The stator 115 is of a double-layer fractional-slot concentrated-winding type. In a concentrated winding electrical machine, the number of slots per pole per phase is fractional and strictly lower than 1. The coils of fractional-slot concentrated windings are concentrated around the teeth, i.e. non-overlapping. In a double-layer machine, each tooth has a winding wound around it, rather than only around alternating teeth, as in a single layer winding electric machine.

The outer diameter of the stator yoke defines a stator outer diameter ($D_{stator,out}$) which in turn defines the active diameter of the electric motor. It will be appreciated that the physical dimensions of the motor, including all of its packaging and ancillaries, will generally be larger than the active diameter, since these components are not included in the definition of the active diameter. Components not part of the active diameter include the housing (where separate from the stator yoke 116), cooling systems, end windings 125, electrical connections etc. For example, the motor 110 comprises a forced-air cooling system comprising a cooling jacket 126. In use, air is forced through the cooling jacket 126 to cool the stator 115. In other configurations, the motor may be cooled by natural convection, or by a liquid cooling system.

Similarly, a radially inner diameter of the stator teeth 117 defines a stator inner diameter ($D_{stator,in}$). The air gap 124 is provided radially inward of the inner diameter $D_{stator,in}$, which extends inwardly until the region defined by a permanent magnet diameter (DPM). The rotor yoke is 120 similarly defined by outer and inner diameters, $D_{rotor,out}$ and $D_{rotor,in}$ respectively.

Figure 5:
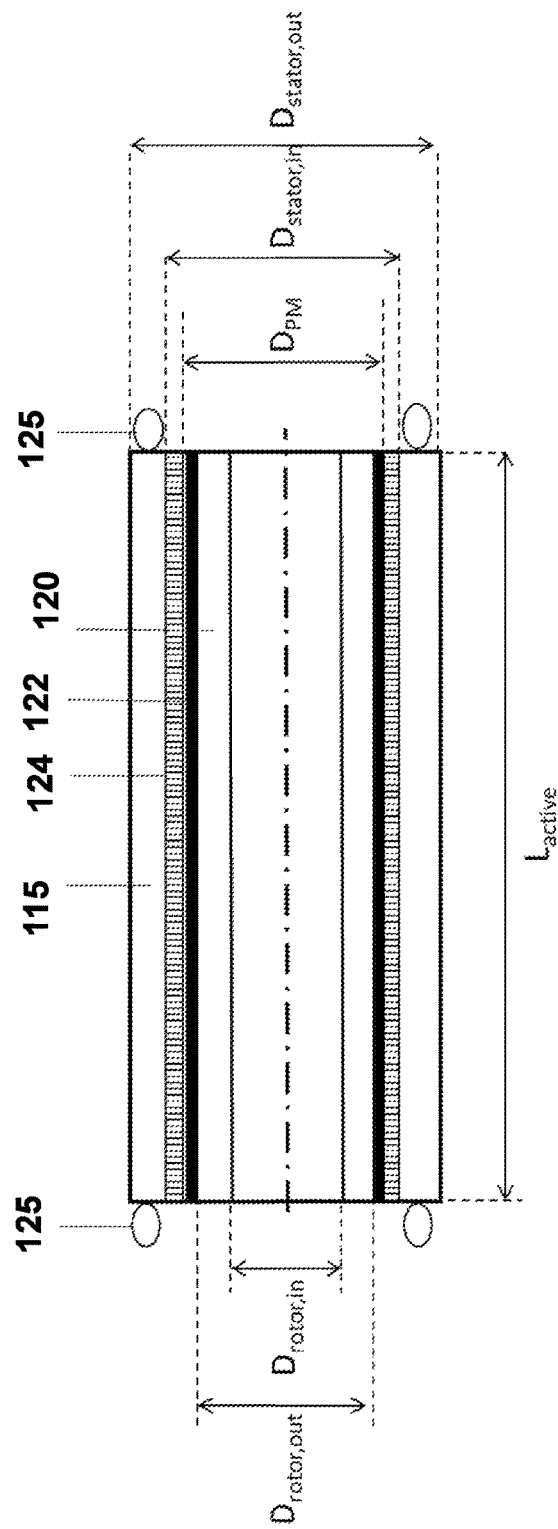
FIG. 5 is a cross-sectional side view of the electric motor of FIG. 4.

FIG. 5 shows a side view of the electric motor 110, and illustrates the dimensions of the motor of FIG. 4, and one additional dimension.

As can be seen, the motor 110 defines an active length $L_{active}$, which is defined as a geometric length of a portion of the motor 110 responsible for generating torque upon the rotor (i.e. the main windings and magnetically active stator components). Similarly, an active diameter $D_A$ is defined as a geometric diameter of a portion of the motor 110 responsible for generating torque upon the rotor 119. Thus, in the present example, the length $L_{active}$ is the length of the lamination stack of the stator 115 and does not include the end windings 125 as they do not generate an appreciable torque upon the rotor. Similarly, the diameter $D_A$ is the diameter of the lamination stack of the stator 115.

The motor 110 further defines operational parameters. In the present embodiment, the electric machine 110 is rated at a maximum continuous power of between 100 kilowatts and 100 megawatts. The term "maximum continuous power", will be understood to relate to the maximum power that can be sustained without duration restrictions, without damaging the motor. Typically, in aerospace, such a rating will be defined during the certification process. In a specific embodiment, the electric machine 110 is rated at 2 megawatts maximum power output.

Similarly, the electric machine 110 is rated at a maximum continuous torque which is typically between 0.5 and 70 kilonewton metres (kN·m), and a maximum mechanical power output of 11 MW. A maximum continuous rotational speed is also defined. The maximum continuous rotational speed is typically between 500 and 50,000 RPM, and in one embodiment is approximately 16870 RPM. Again, the maximum continuous ratings will be understood to relate to the maximum values that can be sustained without duration restrictions.

For a given fan diameter and maximum continuous rotational speed, a maximum continuous fan tip speed $U_{tip}$ can also be defined, since the motor rotor and fan rotate at the same speed.

Similarly, a Motor Diameter Ratio (MDR) can also be defined as a ratio between the inner and outer diameters of the stator yoke $D_{stator,in}:D_{stator,out}$.

The inventors have found that, for a given maximum electric motor torque T, active length $L_{active}$, and tip speed $U_{tip}$, a corresponding optimum motor diameter ratio can be defined by the following equation:

$$MDR = 0.83 \times \left( \frac{\text{Torque}}{L_{active}} \times \frac{1}{U_{fan,\,tip}} \right)^{0.08}$$

The motor diameter ratio (MDR) is the inner diameter of the motor stator ($D_{stator,in}$) in metres divided by an outer diameter of the motor stator ($D_{stator,out}$) in metres. Since the ratio will always be equal to a number divided by a larger number (since the inner diameter is necessarily smaller than the outer diameter), the value will always be less than unity.

This equation holds where the torque is input in kilonewton metres, the active length is in metres, and the fan tip speed is in metres per second. The inventors have found that an optimum motor diameter ratio is provided where the value is within 10%, and preferably within 5%, and more preferably within 2% of the figure computed by the above equation.

It has been found by the inventors that a significant drop-off in motor thermodynamic efficiency occurs where the MDR is more than 20% lower or higher than this figure. This reduced efficiency in turn results in increased power consumption for a given mechanical power output, and increased cooling requirements, which may lead to increased overall system weight. Indeed, optimal efficiency is found where the MDR is within 10%, or even within 2 to 3% of the value computed by the above equation. This discovery had been made using extensive simulations and design processes, which consider the efficiency of both the ducted fan and motor operating together to power an aircraft propulsion system.

This optimum MDR has been found to hold true for a wide variety of motor sizes, as well as motor architectures. For example, the ideal MDR is independent of the rotor pole pair—stator slot combination, number of propulsors of the aircraft, aircraft configuration etc. For example, the propulsor may be a conventional podded under-wing propulsor, which operates in free-stream air, or may comprise a boundary layer ingesting propulsor.

In one example, a propulsion system ("Point B") is designed which comprises a 5.6 MW electric motor. The electric motor is designed to operate at 10659 RPM and has a maximum torque rating of 5 kilonewton metres (kNm). The fan has a diameter of 0.93 metre, and so the fan tip speed is 518 metres per second (i.e. π×the fan diameter×speed in RPM÷60). The motor is designed with an active length $L_{active}$ of 1.066 metres. From these numbers, an optimum MDR can be calculated:

$$MDR = 0.83 \times \left( \frac{\text{Torque}}{L_{active}} \times \frac{1}{U_{fan,\,tip}} \right)^{0.08}$$

Which gives an optimum MDR for this example of 0.570. In this example, the motor efficiency is approximately 0.978, and is operated with a Root Mean Squared (RMS) current loading of 138.3 kilo amps per kg (kA/kg). The actual MDR for this motor as built (i.e. the inner diameter of the motor stator in metres divided by an outer diameter of the motor stator in metres) is calculated as 0.537, and so is within 10% (actual figure is 6%) of the optimum MDR value calculated by the above equation. Consequently, the system has a good overall balance of motor efficiency and propulsive efficiency.

The parameters for point B are summarised in the below table, along with two further examples, which have actual MDR values which are more than 10% outside of the calculated optimum MDR values ("Point A" and "Point C").

|  | Point A | Point B (Locus) | Point C |
|---|---|---|---|
| Speed [RPM] | 10659 | 10659 | 10659 |
| Power [MW] | 5.605 | 5.605 | 5.605 |
| Split ratio - MDR | 0.625 | 0.537 | 0.425 |
| Efficiency | 0.972 | 0.978 | 0.981 |
| RMS Current Loading [kA/m] | 69.7 | 138.3 | 244.9 |
| Power Density [kW/kg] | 6.92 | 9.35 | 10.70 |
| Torque [kN · m] | 5.021 | 5.021 | 5.021 |
| L__active [m] | 1.483 | 1.066 | 0.927 |
| Diameter__fantip [m] | 0.929 | 0.929 | 0.929 |
| Fan Tip Speed [m/s] | 518 | 518 | 518 |
| Torque/L__active [kN · m/m] | 3.385 | 4.712 | 5.418 |
| Split ratio (MDR) from FUNCTION | 0.553 | 0.570 | 0.577 |

As can be seen from the above, the MDR value for the Point A system is 13% greater than the optimum MDR value calculated from the above equation, and the MDR value for the Point C system is 35% less than the optimum MDR value for the Point C system.

The system of Point A has both a lower power density and a lower efficiency than the system of Point B, due to the MDR being more than 10% away from its optimum value. Consequently, the designer is taught to redesign the system to provide a higher MDR (by adjusting the torque, active length, or fan tip speed of the system), in order to improve the overall performance of the propulsion system.

On the other hand, the system of Point C has both a high power density, and a higher efficiency than the systems of either Point A or Point B. However, the increase in efficiency is marginal, and will be more than offset by increased cooling requirements in view of the higher current density. Consequently, the overall efficiency of the propulsive system as a whole is reduced relative to the system of Point B. Again, the designer is informed of this incorrect design by calculating the MDR of the machine and comparing this to the optimum MDR calculated by the above equation. The designer can then redesign the system based on this calculation, by adjusting one or more parameters to arrive at an improved system.

Though we do not wish to be constrained by theory, an understanding of why the optimum MDR lies within this range of values can be had by considering the below results.

The cruise altitudes of the aircraft may range between 20,000 and 40,000 feet, and more typically approximately 35,000 feet, and a cruising speed of between Mach 0.6 to 0.9. The efficiency of the system at these conditions dominates the efficiency of the overall mission, since most time and energy consumption in typical civil aircraft usage occurs during cruise. For some aircraft however, the cruising speeds and altitude may lie outside this range, for example below Mach 0.6 or above Mach 0.9. Purely by way of example, the cruise conditions may correspond to standard atmospheric conditions at an altitude that is in the range of from 20,000 to 40,000 feet.

Figure 6:
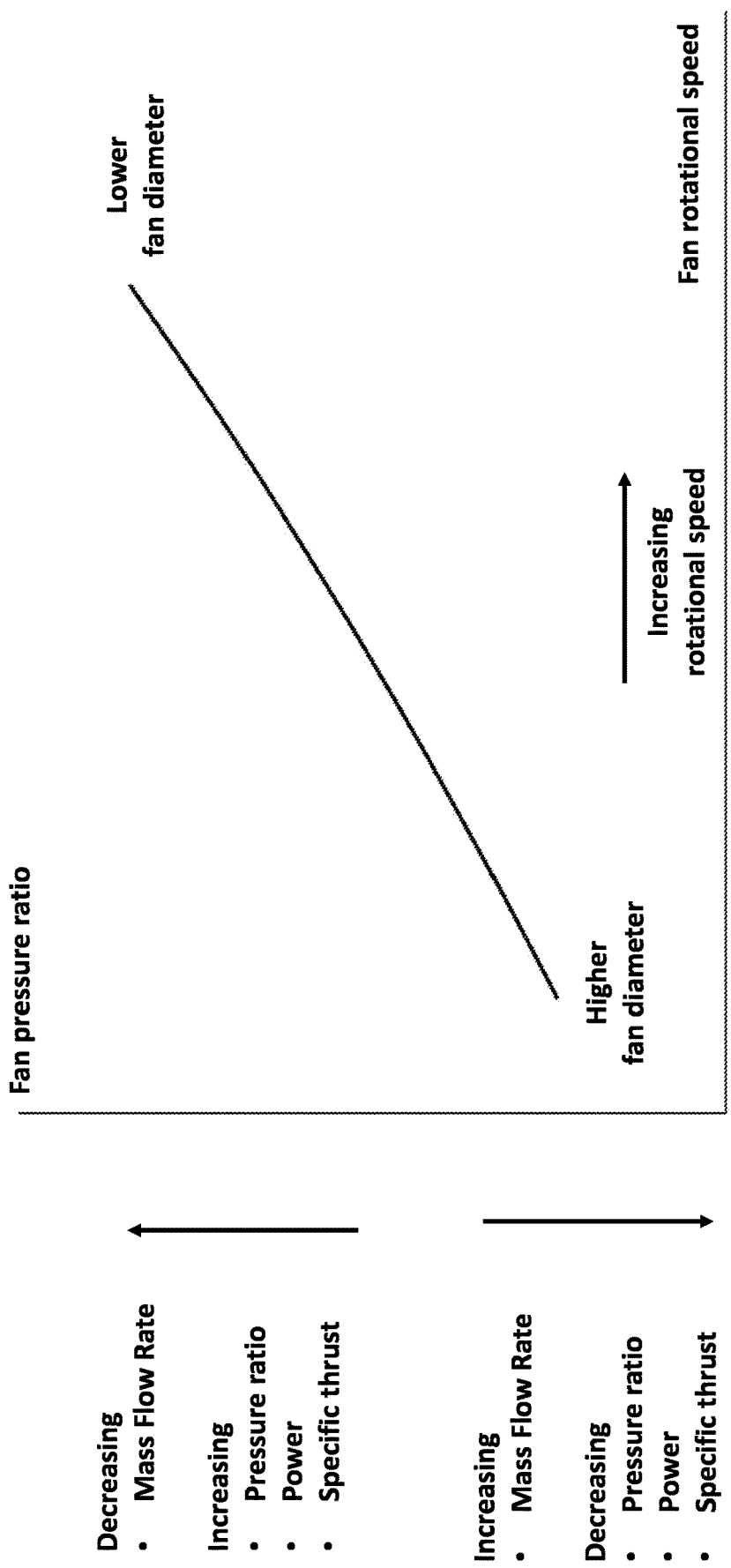
FIG. 6 is a graph illustrating a design space for the propulsion system of FIG. 2.

Fans or propulsors, generate thrust through pressurizing a certain amount of air passing through them. High specific thrust fans or propulsors indicate low mass flow rate for a given thrust generation. The thrust generation depends on pressure rise. In some cases, a high-pressure ratio, i.e., 1.6 to 1.8 is used. On the other hand, low specific thrust fans or propulsors indicate high mass flow rate for a given thrust generation. The thrust generation depends on large mass low rates at a low pressure rise such as a low-pressure ratio, i.e., 1.2 to 1.4. In this respect, at a given thrust, the power required to drive a high specific thrust fan is higher than the power required to drive a low specific thrust fan. This is illustrated in FIG. 6.

The fan pressure ratio as described and/or claimed herein may be defined as the ratio of the stagnation pressure downstream of the fan to the stagnation pressure at the upstream of the fan. The fan specific thrust as described and/or claimed herein may be defined as the ratio of the thrust to mass flow rate passing through the fan or propulsor. Fans having pressure ratios between 1.2 and 1.8 have been considered by the inventors in modelling work.

To ensure an effective efficiency the high specific thrust fan needs to rotate faster than a low specific thrust fan. In general, these high specific thrust fans are compact in size but expensive to operate during a flight due to high power requirements. They have a low-torque and high-speed nature. Low specific thrust propulsors are larger in size and they offer advantages in terms of operation because of low power requirements to produce a given thrust. They have a high torque and low-speed nature. In this respect, the high torque and low-speed is a contradiction condition for electric machine design in terms of power density and efficiency.

The design point of the electric motor was assumed to be 27.5 kN of thrust at Mach 0.22, at sea level, ISA conditions. Notably, the design point of the electric motor is different to the design point of the overall propulsion system, in particular, the fan. This is because the most demanding conditions for the motor occur during take-off, when power requirements are highest. Furthermore, in view of the relatively dense air at sea level, this power must be delivered at relatively low rotational speed, in view of the low rotational speed required for a given thrust level from the fan. As such, at least maximum torque and possibly also maximum power conditions are defined at take-off.

Another aspect of the dimensional changes in the propulsor is associated with the hub-to-tip radius ratio of the fan or propulsor. According to a design of choice or installation fans may have different values of hub-to-tip radius ratio. At a fixed specific thrust, same pressure ratio, a low hub to tip ratio fan may need to rotate faster than a high hub to tip radius ratio fan to keep have a proper aerodynamic loading and hence efficiency. Hub-to-tip ratios of between 0.3 and 0.6 were considered by the inventors.

At these conditions, the electric machine design defined by fan torque, speed and the available space to fit the machine need to be addressed carefully as they reflect the design of the electric motor. The electric motors required to drive low specific thrust fans tend to be relatively high diameter and short in axial length. The electric motors required to drive the high specific thrust fans need to be relatively low diameter and long in axial length. The higher speed advantage makes the motors power dense which drive the high specific thrust fans. On the other hand, the motors driving the low specific thrust fans can be characterised as high torque dense. Their lower power density due to less speed can be overcome in several ways, such as utilizing a gearbox such that the electric motor rotates faster than the fan, or increasing the rated frequency of the electric motor through change of rotor poles.

Apart from those, the electric motors may be designed for take-off, cruise, or top of climb requirements of the flight mission. The ducted fan propulsor may provide a fixed percentage of the total aircraft thrust or a variable percentage of the aircraft total thrust based on its design criteria. For example, a subset of the propulsors may comprise electric propulsors, with the remaining propulsors comprising gas turbine engine driven propulsors such as turbofans or turboprops. In one example, a tail propulsor is provided comprising a boundary layer ingesting turbofan, and wing mounted propulsors are provided in the form of electric propulsors. In such a case, the electric propulsor is designed as a thrust augmenter for take-off.

Figure 7:
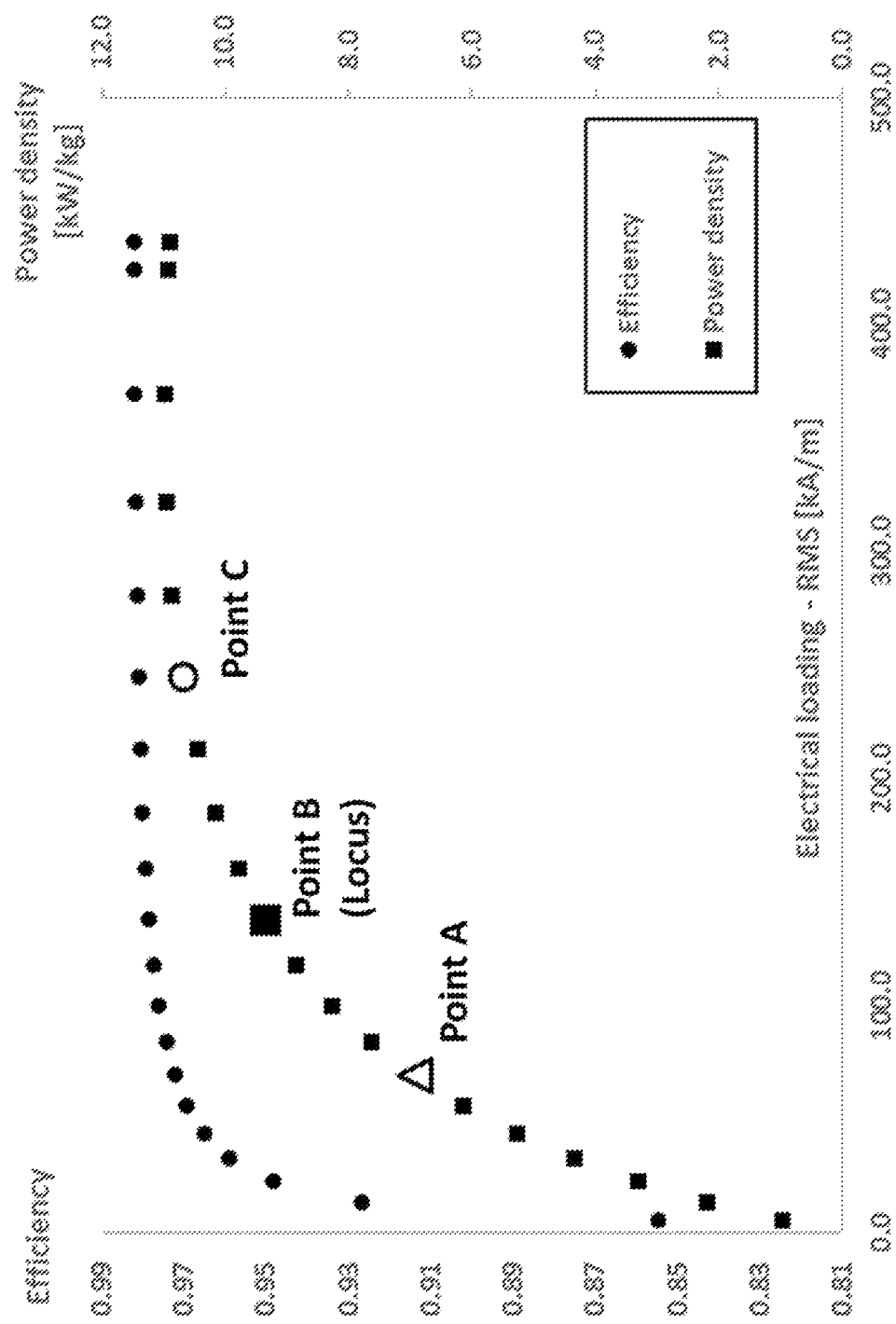
FIG. 7 is a graph illustrating relationships between efficiency and power density at different electrical loadings for the electric motor of FIG. 4.

Based on the large number of constraints in the design of the electric propulsor, FIG. 7 shows modelling results for motors having different Motor Diameter Ratios (MDR). In FIG. 7, the design space of an electric motor driving a particular fan is plotted by varying the MDR. Therefore, the dimensional and aero-thermo-mechanical constraints such as the outer diameter, torque and the speed of all points are the same. Efficiency (primary y-axis) and the power density (secondary y-axis) are plotted against the current density. The left-hand side of the x-axis has high MDR and the right-hand side has low MDR. It can be seen that the efficiency of the overall propulsion system increases rapidly with decreasing MDR ratio, and then the curve flattens. The power density has a similar trend. It can be concluded that there is no need to increase the current density (lowering the MDR) for a minimal increase in the efficiency after the curve flattens, because increasing the electric loading excessively makes the motor difficult to cool properly. There should be some sacrifice in the power density while maintaining the efficiency. The selection point should lie somewhere in the locus of the power density curve. For example, in FIG. 7, approximately 140 A/mm Root Mean Squared (RMS) electrical loading, showing the locus (point B), is a good point to select.

Figure 8:
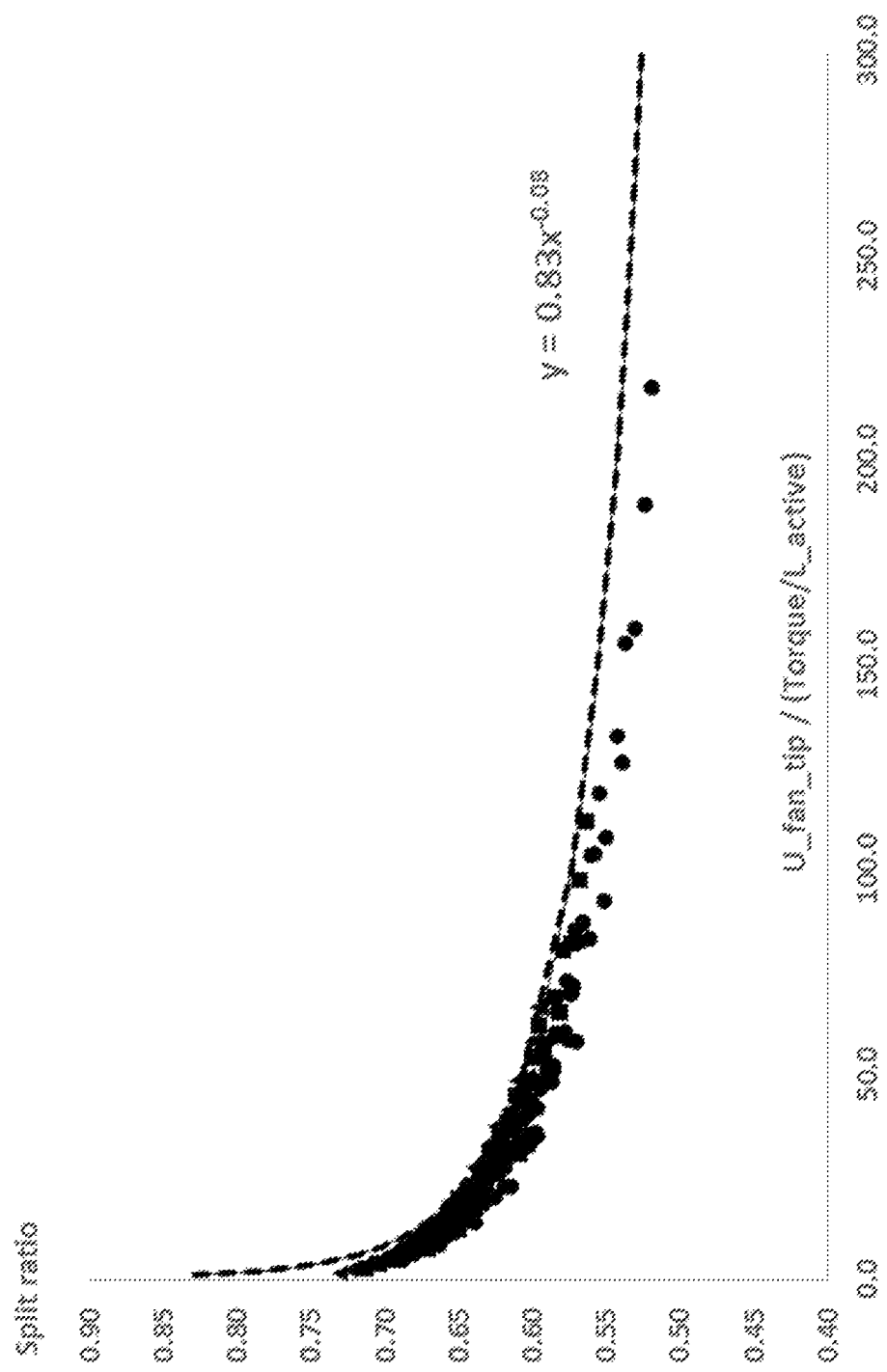
FIG. 8 is a graph showing motor split ratio as a function of fan tip speed divided by torque per active length.

In FIG. 8, the values for the design space considering different MDRs and current loadings are given. A curve can be fitted to the overall design space which makes the obtained relation independent of machine to fan exit diameter ratio, current loading, rating point, and rotor pole pair-stator slot orientation. The presence of the torque per unit active length makes the obtained curve independent of the electric motor rating point (take-off, cruise, variable percentage thrust etc.). If the motor needs to be rated for a higher torque, the only requirement is to make it longer, (i.e. increase the active length) which keeps the new electric motor on the curve of FIG. 8.

Consequently, the inventors have found a range of parameters, which result in an effective electric motor drive propulsion system for an aircraft. The system has both high propulsive efficiency (in view of considering the fan performance), and high electric motor efficiency. Additionally, the system is of low weight, having a high torque and power density, and not requiring a heavy gearbox, though gearboxes could optionally be included in the design. The system is suitable for aircraft of various types, including relatively large narrow-body or wide-body aircraft, as well as smaller, regional type aircraft.

Figure 9:
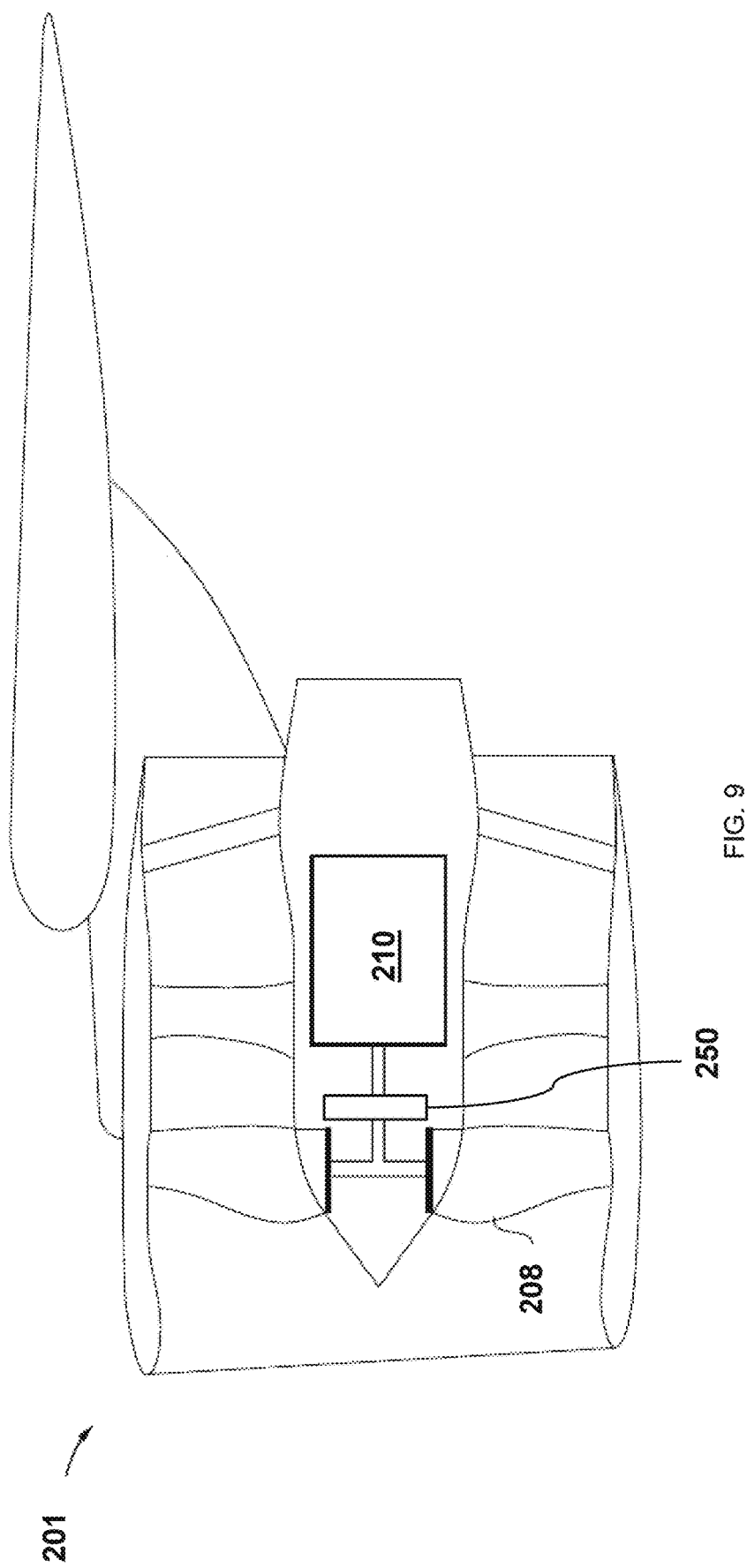
FIG. 9 is a schematic diagram of an alternative propulsion system for the aircraft of FIG. 1 comprising a reduction gearbox.

Alternatively, the system can be employed with a geared propulsion system. FIG. 9 shows such a propulsion system 201. The propulsion system 201 is similar to the system 101, comprising a gearbox 250. The gearbox couples a motor 210 to the fan 208, thereby providing a reduction ratio between the motor 210 and fan 208. In such a case, higher speed motors may be utilised, which may rotate at up to 50,000 RPM, while maintaining lower fan rotational speeds.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the fans may be installed in other locations, such as above the wings or fuselage. The aircraft could be of a different configuration, such as a blended wing body (BWB) or flying wing configuration. The propulsion system may comprise a single fan, or a large number of fans in a distributed propulsion arrangement.

The propulsion system may be part of a hybrid propulsion system. For example, the electric motor may be powered by electrical power derived from an onboard electric generator driven by an internal combustion engine such as a gas turbine engine or piston engine.

The invention claimed is:

1. An aircraft propulsion system comprising:
a propulsor;
an electric motor coupled to the propulsor; wherein
the electric motor comprises a surface mounted permanent magnet electric machine comprising a rotor mounted radially inward of a stator; and wherein
a Motor Diameter Ratio (MDR) is defined as an inner diameter of the motor stator in metres divided by an outer diameter of the motor stator in metres, and wherein
the MDR of the electric motor stator is within 20% of an optimum MDR value given by the equation:

$$MDR_{optimum} = 0.83 \times \left( \frac{\text{Torque}}{L_{active}} \times \frac{1}{U_{fan,\,tip}} \right)^{0.08}$$

where:
Torque is the maximum torque rating of the electric motor in kilo newton metres;
$L_{active}$ is the active length of the motor stator in metres; and
$U_{fan,tip}$ is the tip speed of the propulsor at the maximum rated torque of the electric motor in metres per second; and
wherein
the MDR is less than 1.

2. The aircraft propulsion system according to claim 1, wherein the propulsion system comprises a ducted fan such as a boundary layer ingesting fan.
3. The aircraft propulsion system according to claim 1, wherein the electric motor and propulsor are directly coupled, such that the rotor and propulsor rotate at the same speed in use.
4. The aircraft propulsion system according to claim 1, wherein the propulsion system comprises a reduction gearbox configured to couple the electric motor to the propulsor, such that the propulsor rotates at a lower speed than the motor in use.
5. The aircraft propulsion system according to claim 4, wherein the gearbox defines a reduction ratio of between 1:1 and 2.5:1.
6. The aircraft propulsion system according to claim 1, wherein the electric motor comprises a radial-flux electric motor.
7. The aircraft propulsion system according to claim 1, wherein the electric motor defines a maximum torque rating of between 0.5 and 70 kilonewton metres.
8. The aircraft propulsion system according to claim 1, wherein the electric motor defines a maximum power of between 0.1 and 100 Megawatts.
9. The aircraft propulsion system according to claim 1, wherein the electric motor defines a maximum rotational speed of between 500 and 50000 Revolutions per Minute.
10. The aircraft propulsion system according to claim 1, wherein the propulsion system is configured to operate at a maximum cruise speed of between Mach 0.6 and 0.9 at a maximum cruising altitude of between 20,000 feet and 40,000 feet.
11. The aircraft propulsion system according to claim 1, wherein the propulsor defines a maximum in use pressure ratio of between 1.2 and 1.8 during cruise conditions.
12. The aircraft propulsion system according to claim 1, herein the propulsor comprises a hub-to-tip ratio of between 0.2 and 0.7.
13. The aircraft propulsion system according to claim 1, wherein the motor diameter ratio is within 5% of the optimum MDR value given by the equation in claim 1.
14. An aircraft comprising the aircraft propulsion system according to claim 1.
15. The aircraft propulsion system according to claim 1, wherein the motor diameter ratio is within 2% of the optimum MDR value given by the equation in claim 1.

* * * * *